Dec. 11, 1951　　　J. F. HUSSEY ET AL　　　2,578,427
APPARATUS FOR THE LIQUID TREATMENT
OF FRUITS AND VEGETABLES
Filed March 30, 1948　　　　　　　　　　　　　4 Sheets-Sheet 3
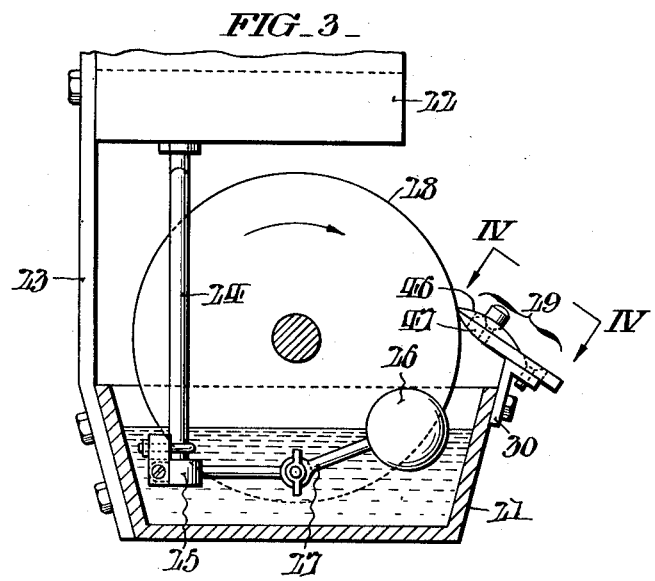
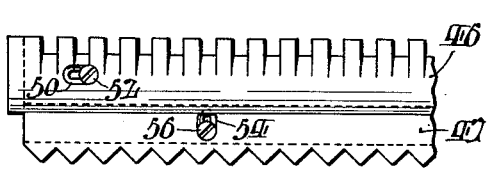
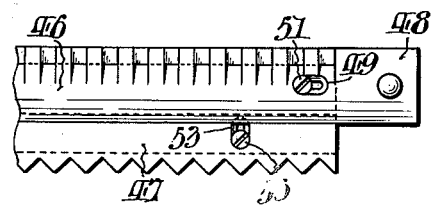
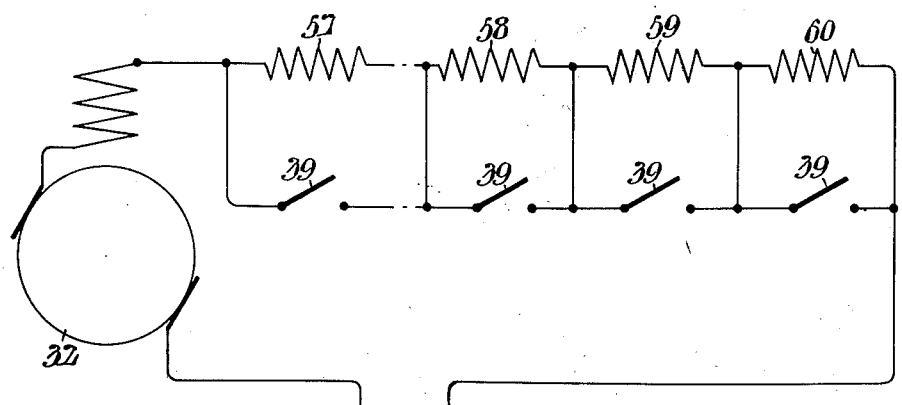
WITNESSES
INVENTORS:
James F. Hussey and
Bayard S. Johnson,
BY
Paul & Paul
ATTORNEYS.

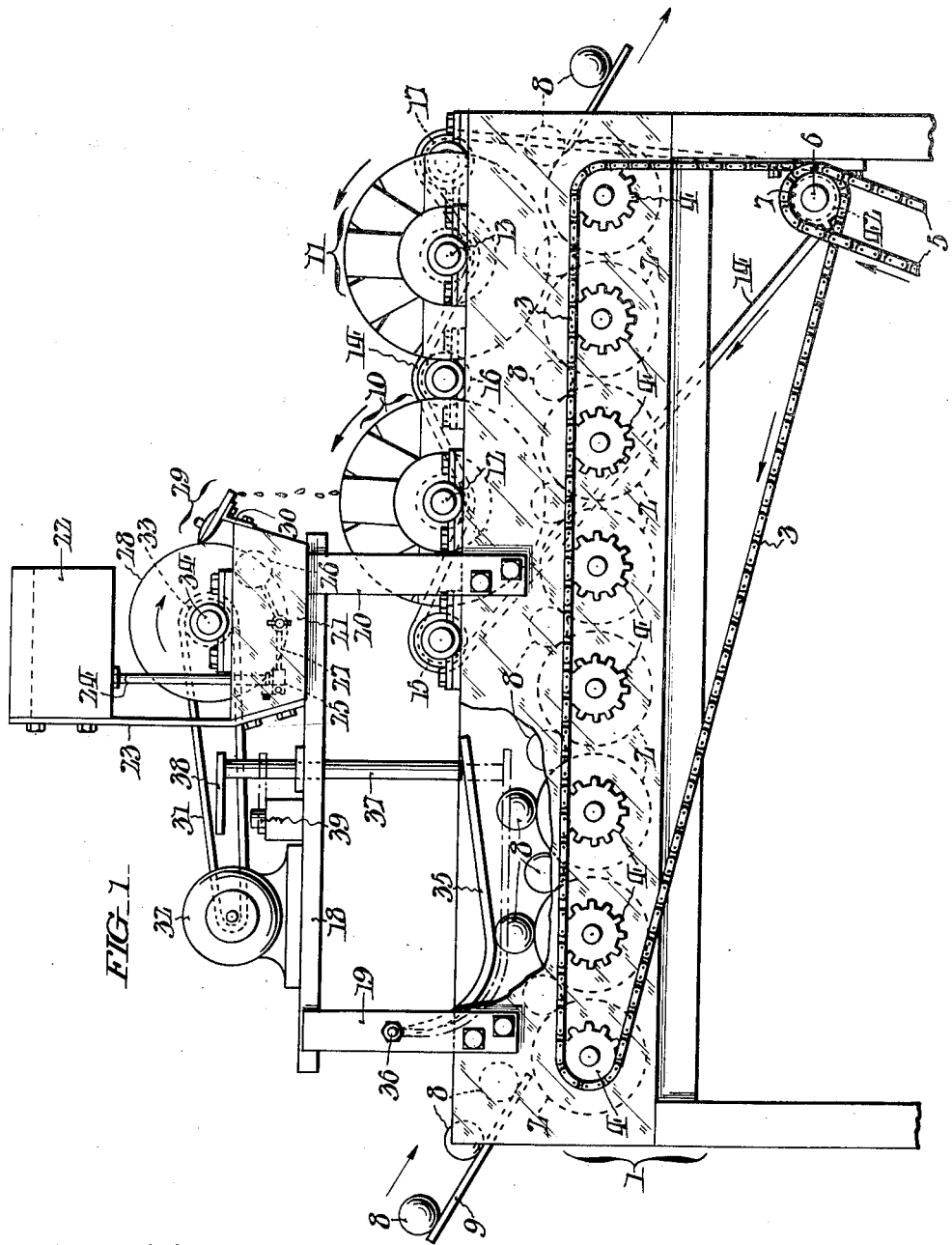

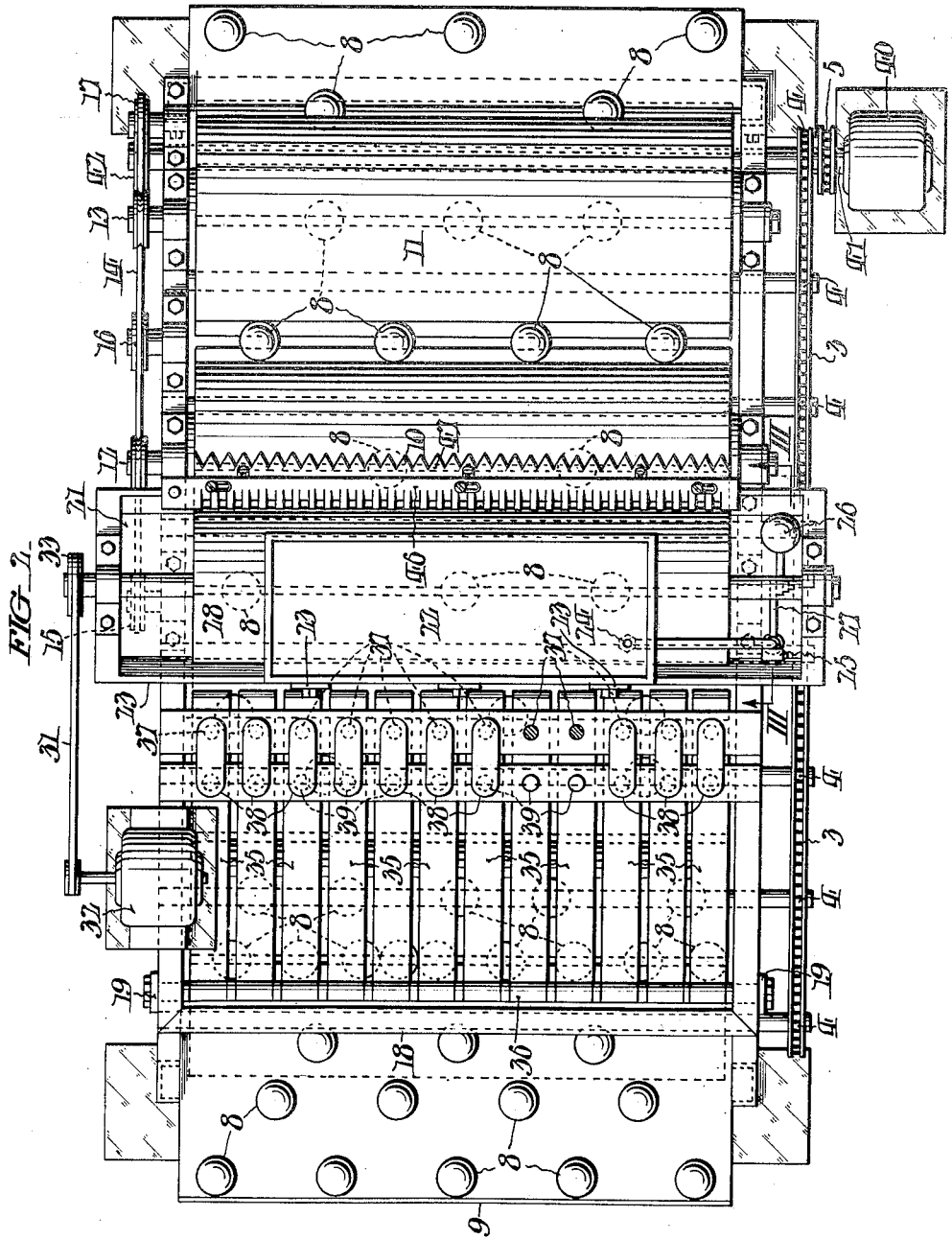

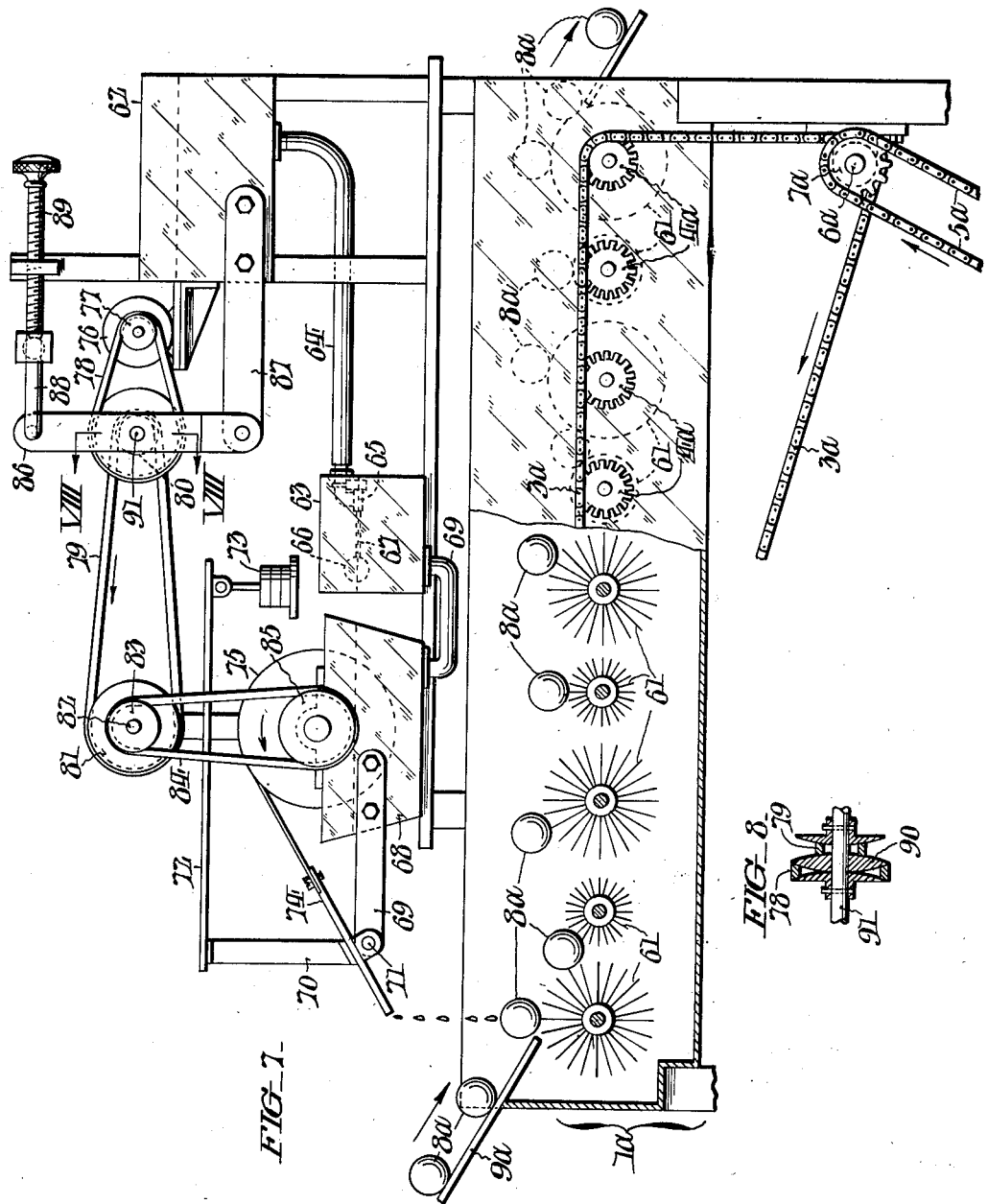

Patented Dec. 11, 1951

2,578,427

UNITED STATES PATENT OFFICE 2,578,427

APPARATUS FOR THE LIQUID TREATMENT OF FRUITS AND VEGETABLES

James F. Hussey, Orlando, Fla., and Bayard S. Johnson, Merwood Park, Pa., assignors to Franklin Research Company, Philadelphia, Pa., a corporation of Pennsylvania Application March 30, 1948, Serial No. 17,954

7 Claims. (Cl. 91—39)

This invention relates to a novel means for the liquid treatment of fruits and vegetables and more particularly to a method of treating fruits and vegetables with droplets of liquid and to a drip applicator for carrying out such treatment.

Various methods of treating fruits and vegetables with liquids have hitherto been proposed. For instance, in the application of wax to objects of this sort it has been common practice to pass the objects to be treated through a dip tank containing an emulsion of the desired wax. Another method in common use involves the use of heat to form a wax-containing vapor or fog which is then deposited on the objects being treated. These methods have not been entirely satisfactory and consequently improvements have been suggested one of which consists in producing a foam of wax in place of the usual liquid wax emulsion and then applying the foam wax to the fruits and vegetables to be treated. However, this foam wax method introduces further difficulties in obtaining uniform flow and also with respect to the characteristics of the emulsion itself since one of the requirements of such an emulsion is that it can be converted to a foam. We have found that certain emulsions which are non-foaming in character are superior to foaming emulsions for many purposes. Such emulsions cannot be used in a foam applicator but could be used if a satisfactory drip applicator was available.

A further difficulty in the prior art apparatus for applying liquids to fruits and vegetables has been that such methods tend to produce non-uniform results where the flow of objects to be treated is either intermittent or subject to fluctuations in the number of objects presented for treatment. This has led to uneven results in which the objects have received either too much or too little liquid coating and also has resulted in loss of liquid and undesirable accumulations in the machine.

One object of the present invention is, therefore, to provide means for uniformly applying a non-foaming liquid to fruits and vegetables.

A further object of the present invention is to provide means for accomplishing the uniform application of discreet liquid droplets to fruits and vegetables by means adapted to furnish a controlled, predetermined drip of said liquid.

A still further object of the present invention is to provide means for uniformly applying discreet liquid droplets to a moving supply of fruits and vegetables and to automatically increase the drip rate of such droplets when the fruit and vegetable supply is large and to automatically reduce the drip rate as the fruit and vegetable supply decreases with said reduction in drip rate being proportional to the decrease in supply.

In the drawings, Fig. 1 is a side elevation of one form of the present invention with a part broken away to disclose important features.

Fig. 2 is a plan view of the same.

Fig. 3 is a vertical sectional view drawn to a larger scale and taken as indicated by the lines and arrows III—III in Fig. 2 of the liquid supply means.

Fig. 4 is a view of the adjustable scraper blade taken as indicated by the lines IV—IV in Fig. 3.

Fig. 5 is a showing of the scraper element of Fig. 4 in its closed position.

Fig. 6 is a circuit diagram of the means for varying the speed of the motor drive means shown in Fig. 1.

Fig. 7 is a side elevation of an alternative form of the present invention.

Fig. 8 is a transverse sectional view of a variable speed control mechanism taken as indicated by the lines and arrows VIII—VIII in Fig. 7.

Referring now to Figs. 1 and 2, a table 1 is shown having mounted thereon a number of transverse rolls 2 which may be made of metal and which are driven in a clockwise direction by the chain 3 which engages the sprockets 4. Drive means comprising motor 40 and shaft 41 engage the chain 5 by means of a sprocket (not shown) mounted on shaft 41 and bring about a motion of chain 3 in the desired direction through the operation of shaft 6 to which is attached sprocket 7 and an additional sprocket which engages chain 3. Objects to be treated, such as fruits and vegetables are shown at 8 and are fed to the treating table by means of the inclined chute 9. Wiper rolls 10 and 11 made up of horsehair, cloth or the like are rotatably mounted on the shafts 12 and 13 respectively and are driven by the belt 14 which in turn derives its motion from a sheeve 42 mounted on shaft 6. Idler sheeves 15, 16 and 17, rotationally mounted as shown, are provided so as to produce a counter-clockwise rotation of the wiper rolls 10 and 11.

Supporting platform 18 is mounted on the table 1 by means of brackets 19 and 20. Mounted on platform 18 is supply tank 21 which receives its supply of liquid from the reservoir 22 supported by the bracket 23 attached to the back wall of supply tank 21 as shown. Liquid flows from the reservoir 22 through the supply pipe 24 and is metered to the tank 21 through the control valve 25 which is operated by the float 26 through the linkage 27. A predetermined desired liquid level is thereby maintained in the supply tank 21 regardless of the rate of withdrawal of liquid from tank 21. Withdrawal means comprising cylinder 28 is rotatably mounted above the supply tank 21 with a part of its periphery extending below the liquid level in tank 21 and is driven as hereinafter described. It is constructed of a non-porous, non-absorbing material such as Bakelite or hard rubber adapted to pick up a film of liquid at its periphery on rotation through the controlled liquid in tank 21. Scraper assembly 29, hereinafter described in detail, is mounted on the front wall of tank 21 by means of bracket 30 and engages the periphery of the cylinder 28 as shown. Liquid is thus scraped from the periphery of cylinder 28 as it rotates. Scraper assembly 29 is provided with a saw-toothed edge for the delivery of liquid drops across the path of the articles to be treated as shown in Fig. 2. Belt 31 driven by motor 32 engages a sheeve 33 attached to shaft 34 of cylinder 28 and thereby brings about a clockwise rotation of cylinder 28 as indicated by the arrow. The quantity of liquid scraped from the periphery of cylinder 28 as it rotates may be varied by a suitable adjustment of the blades of the scraper assembly 29 as hereinafter described and this quantity may also be varied by changing the liquid level in tank 21.

The drip rate of the liquid delivered from the saw-toothed edge of the scraper assembly 29 is therefore a function of the rate of rotation of the cylinder 28, the relative position of the scraper blades to one another and the liquid level of the tank 21, with the drip rate approaching zero as the rate of rotation of the cylinder 28 approaches zero. It will be apparent that the liquid droplets coming from the scraper assembly may be applied to the objects to be treated through the medium of a wiper roll as shown in Fig. 1 or alternatively may be applied directly as shown in the apparatus shown in Fig. 7. In either case the treating liquid leaves the scraper assembly in the form of a curtain made up of falling droplets which curtain extends across the path of the objects as they are advanced for treatment.

Fig. 3 is an enlarged view showing the liquid withdrawal means of the present invention in detail. It will be noted that the scraper assembly 29 is mounted on a bracket 30 and is arranged to be held in positive contact with the periphery of the rotating cylinder 28. The blade elements 46 and 47 of scraper assembly 29 are adjustable relative to one another as shown in detail in Figs. 4 and 5. Adjustment of the scraper blades is made manually by means of the adjusting tab 48, lateral movement being guided in the slots 49 and 50 in which guide screws 51 and 52 are positioned. Slots 53 and 54 are provided for positioning the scraper assembly with respect to the periphery of cylinder 28 and operate in conjunction with the screws 55 and 56 as shown. It will be apparent that the means shown in Figs. 4 and 5 provide the possibility of adjusting the delivery rate from the scraper assembly through a continuous range from a full rate of flow as shown in Fig. 5 to a half rate of flow as shown in Fig. 4. Intermediate positions of adjustment in the slots 49 and 50 give corresponding rates of flow intermediate between full rate and half rate.

In Fig. 6 there is shown a circuit comprising the motor 32 and resistances 57, 58, 59 and 60 which are in circuit with the field of motor 32 and the line L2 as shown. Micro-switches 39 are shown in the open position corresponding to a reduced flow of fruit through the machine. The other side of the motor 32 is connected to L1.

Fig. 7 shows an alternative form of machine in which the liquid drops coming from the scraper assembly fall directly on the incoming fruit. In this form of the machine a bed of transverse brushes 61, preferably constructed of horsehair, is provided in place of the rollers 6 of Fig. 1 and the wiper rolls 10 and 11 of Fig. 1 are eliminated. Reservoir tank 62 provides liquid to the tank 63 through the pipe 64 the flow being metered through the control valve 65 which is operated by the float 66 through the linkage 67. The tank 63 communicates with supply tank 68 through pipe 69. The liquid level in supply tank 68 is thereby maintained at a point determined by the float 66. Attached to supply tank 68 is the arm 69 to which is pivotally attached arm 70 which is free to rotate about the pivot 71. Arm 72 is attached to arm 70 and has suspended at the end thereof means for carrying weight elements 73. Scraper assembly 74 is attached to pivot arm 70 and is held in close contact with the periphery of cylinder 75 through the action of the weights 73 and the associated arms 72 and 70.

Cylinder 75 is rotated in a counter-clockwise direction by means of motor 76 to which is attached sheeve 77 which is engaged by drive belt 78. Drive belt 79 engages sheeve 80 and sheeve 81 the latter being mounted on shaft 82 which also carries sheeve 83 carrying drive belt 84 which engages sheeve 85 and thereby drives cylinder 75. Motor 76 operates at constant speed and therefore speed adjusting means are provided consisting of movable arm 86 pivotally mounted on arm 87 which is in turn fixedly attached to the wall of reservoir 62. Attached to the upper end of arm 86 is an adjusting rod 88 which is movable through operation of adjusting screw 89 as shown.

The speed adjusting mechanism is shown in more detail in Fig. 8 which comprises a sectional view taken as indicated by the arrows VIII—VIII of Fig. 7. Movement of the arm 86 to the right as viewed in Fig. 7 results in decreasing the tension on drive belt 78 and increasing the tension on drive belt 79. As a consequence belt 78 moves upwardly as shown in Fig. 8 and belt 79 moves downwardly. This movement results from the fact that the intermediate member 90 of Fig. 8 is free to move along the shaft 91 in response to the changing tensions of the belts 78 and 79. It will be apparent that the mechanical speed adjustments shown in Figs. 7 and 8 can be made responsive to the flow of fruit through a mechanical adaptation of the electrical system shown in Fig. 1.

To preclude repetitive description, all elements of the modified construction not specifically referred to, but having their counterparts in the first described form of our invention, are identified by the same reference characters previously used with addition of the letter "a" for convenience of better distinction.

Having described apparatus for providing a controlled and adjustable drip rate, we will now describe a form of apparatus for automatically varying the drip rate proportional to changes in the number of objects being presented for treatment. A series of movable arms 35 is pivotally mounted on the shaft 36 which is attached to bracket 19. The arms 35 make contact with a series of push rods 37 which pass upwardly through the platform 18 and have attached to their upper ends a series of contact arms 38 which operate the switches 39 which may be micro-switches or the like. The switches 39 are normally closed and are arranged in a circuit including the motor 32 as shown in Fig. 6. The effect of opening the normally closed switches 39 is to increase the speed of motor 32 since the closing of any of these switches removes the corresponding resistance from the energizing circuit of motor 32.

It will thus be seen that with a capacity flow of fruit across the table all or substantially all of the movable arms 35 will be moved to the up position and consequently all or substantially all of the micro-switches 39 and be in their normally closed position. In the event that there is a decrease in the flow of fruit passing under the arms 35, one or more of such arms will drop to the normal position as shown in the dotted lines in Fig. 1 and the corresponding push rod 37 will drop to the position shown. This results in the arm 38 making contact with the corresponding micro-switch and thus adding resistance to the energizing circuit of motor 32 as such switch is opened. The speed at which motor 32 runs is therefore automatically responsive to the rate of flow of the incoming fruit or vegetables and the rate of rotation of cylinder 28 is likewise responsive thereto. Since the other variables in the system, namely the liquid level in tank 21 and the blade setting of blade assembly 29, have been set at predetermined values, the drip rate of fluid leaving the scraper assembly is automatically responsive to the rate of flow of the incoming objects to be treated.

Having thus described our invention, we claim:

1. Fruit and vegetable treating apparatus comprising, in combination, a table, means for advancing objects to be treated across said table, liquid supply means, a cylinder rotatably mounted and extending into said liquid supply means, variable drive means including an electric motor constructed and arranged for rotating said cylinder, electric control means in circuit with said motor constructed and arranged to vary its speed of rotation, a plurality of movable arms positioned in the normal path of advancement of said objects for contact therewith and constructed and arranged to undergo a change of position when contacted by the advancing objects, means responsive to said changes in position of said arms for actuating said electric control means, a scraper bar engaging said cylinder at the periphery thereof, and means constructed and arranged for delivering liquid from said scraper bar to the advancing objects.

2. In apparatus of the character described, a scraper bar assembly comprising a plurality of blades in contact with and overlying each other, each having cut-out portions at the contact edge thereof, one of said blades being movable laterally with respect to the other.

3. Apparatus for treating work objects with liquid, comprising a table, advancing means for the work objects delivered to the table, liquid supply means, a cylinder rotatably mounted and extending into the liquid supply means, means for rotating the cylinder, speed control apparatus for varying the speed of rotation of said cylinder, mechanical means movable when contacted by the advancing objects and connected to said speed control apparatus to change the speed of rotation of the cylinder when so moved, and delivery means constructed and arranged to transfer liquid from the periphery of the cylinder to said objects at a rate dependent upon the speed of rotation of said cylinder.

4. Apparatus for treating work objects with liquid, comprising a table, advancing means for the work objects delivered to the table, liquid supply means, a cylinder rotatably mounted and extending into the liquid supply means, means for rotating the cylinder, speed control apparatus for varying the speed of rotation of said cylinder, an arm interposed in the normal path of advancement of the work objects, said arm being movable when contacted by the advancing objects, means including said arm operatively connected to said speed control apparatus to change the speed of rotation of the cylinder when said arm is moved, and delivery means constructed and arranged to transfer liquid from the periphery of the cylinder to said objects at a rate dependent upon the speed of rotation of said cylinder.

5. Apparatus for treating work objects with liquid, comprising a table, advancing means for the work objects delivered to the table, liquid supply means, a cylinder rotatably mounted and extending into the liquid supply means, means for rotating the cylinder, means for varying the speed of rotation of said cylinder, an arm attached to said speed varying means and interposed in the normal path of advancement of the work objects for contact therewith, said arm being movable when contacted by the advancing objects, means including said arm and constructed and arranged in operative relationship with said speed varying means to change the speed of rotation of the cylinder when said arm is moved, and delivery means constructed and arranged to transfer liquid from the periphery of the cylinder to said objects at a rate dependent upon the speed of rotation of said cylinder.

6. Apparatus for treating work objects with liquid, comprising a table, advancing means for the work objects delivered to the table, a liquid supply reservoir, a rotatably mounted cylinder partially submerged in said liquid, an electric motor for rotating said cylinder, an electric circuit including a resistor and a switch for varying the speed of the motor, an arm disposed in the normal path of advancement of the work objects on said table and connected to actuate the switch in response to the advancement of the work objects on said table, and delivery means constructed and arranged to transfer liquid from the periphery of the cylinder to said work objects at a rate dependent upon the speed of rotation of said cylinder.

7. The invention of claim 3 further characterized by the fact that the means for rotating the cylinder comprises an electric motor, and the speed control apparatus comprises a plurality of resistances and switches in circuit with said motor, said switches being operatively connected to the mechanical means and actuated thereby.

JAMES F. HUSSEY.
BAYARD S. JOHNSON.

REFERENCES CITED

The following references are of record in the file of this patent:

UNITED STATES PATENTS

| Number | Name | Date |
|---|---|---|
| 1,671,923 | Brogden | May 29, 1928 |
| 1,827,923 | Wildman et al. | Oct. 20, 1931 |
| 1,932,727 | Faulkner | Oct. 31, 1933 |
| 1,940,269 | Pierce | Dec. 19, 1933 |
| 1,985,842 | Skinner | Dec. 25, 1934 |
| 2,136,118 | Palmer | Nov. 8, 1938 |
| 2,362,926 | Porch | Nov. 14, 1944 |
| 2,430,187 | Recker | Nov. 4, 1947 |
| 2,442,616 | Recker | June 1, 1948 |